United States Patent [19]

De Puydt et al.

[11] 3,817,548

[45] June 18, 1974

[54] METHOD AND APPARATUS FOR STABILIZING A CASTER WHEEL AGAINST WHIP ACTION

[75] Inventors: Frank A. De Puydt; Eugene P. Conradi, both of Des Moines, Iowa

[73] Assignee: Dico Company, Inc., Des Moines, Iowa

[22] Filed: June 28, 1971

[21] Appl. No.: 157,233

[52] U.S. Cl............................ 280/89, 16/35, 74/574, 188/1, 188/80
[51] Int. Cl.............................................. B60b 33/00
[58] Field of Search ............ 16/35, 35 D; 188/10 X, 188/180 X, 80 X; 244/103 R, 103 W, 104 R; 74/572, 573, 574; 280/93, 94, 79.1, 86, 89

[56] References Cited
UNITED STATES PATENTS

| | | | |
|---|---|---|---|
| 397,120 | 2/1889 | Gilbert................................. | 188/80 |
| 500,649 | 7/1893 | Duff..................................... | 188/80 |
| 1,778,641 | 10/1930 | Nelson................................. | 74/574 |
| 1,830,105 | 11/1931 | Griswold.............................. | 280/89 |
| 1,945,874 | 2/1934 | Weaver................................ | 280/89 |
| 2,482,961 | 9/1949 | Bishop................................. | 16/35 D |
| 2,572,589 | 10/1951 | Bishop................................. | 244/103 W |
| 3,352,515 | 11/1967 | Albright.............................. | 244/103 R |

Primary Examiner—Bobby R. Gay
Assistant Examiner—Doris L. Troutman
Attorney, Agent, or Firm—Rudolph L. Lowell

[57] ABSTRACT

The stabilizing or anti-whip device has a fly wheel or like mass member rotatably supported on the vehicle frame adjacent the caster wheel assembly which has an upright shaft or king pin rotatably carried on the upright frame. The fly wheel shaft is interconnected with the king pin for rotation at an increased rate relative to the rotation of the king pin so as to restrain or inhibit oscillation of the caster wheel in response to forces acting on and tending to whip the caster wheel.

4 Claims, 5 Drawing Figures

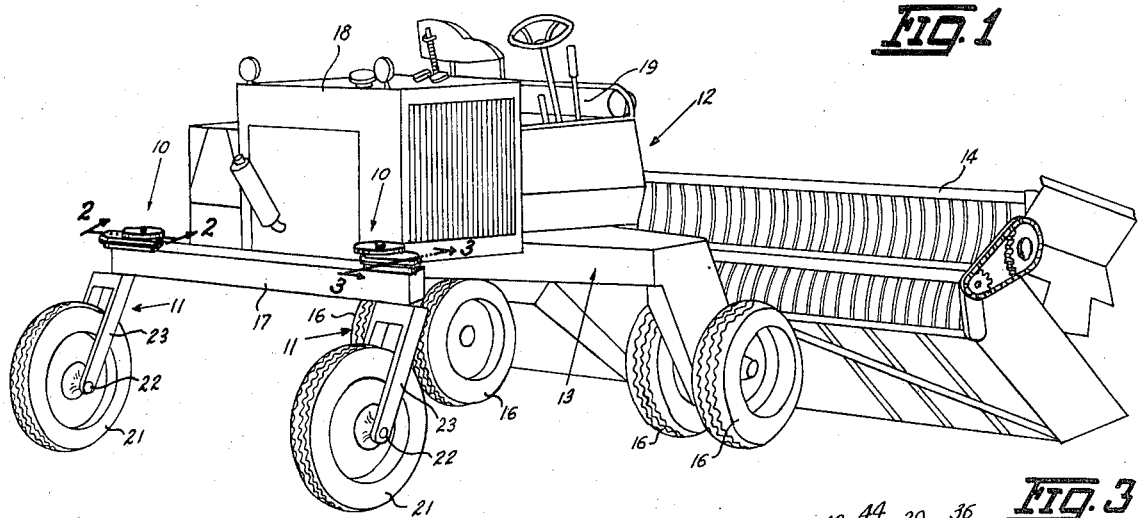
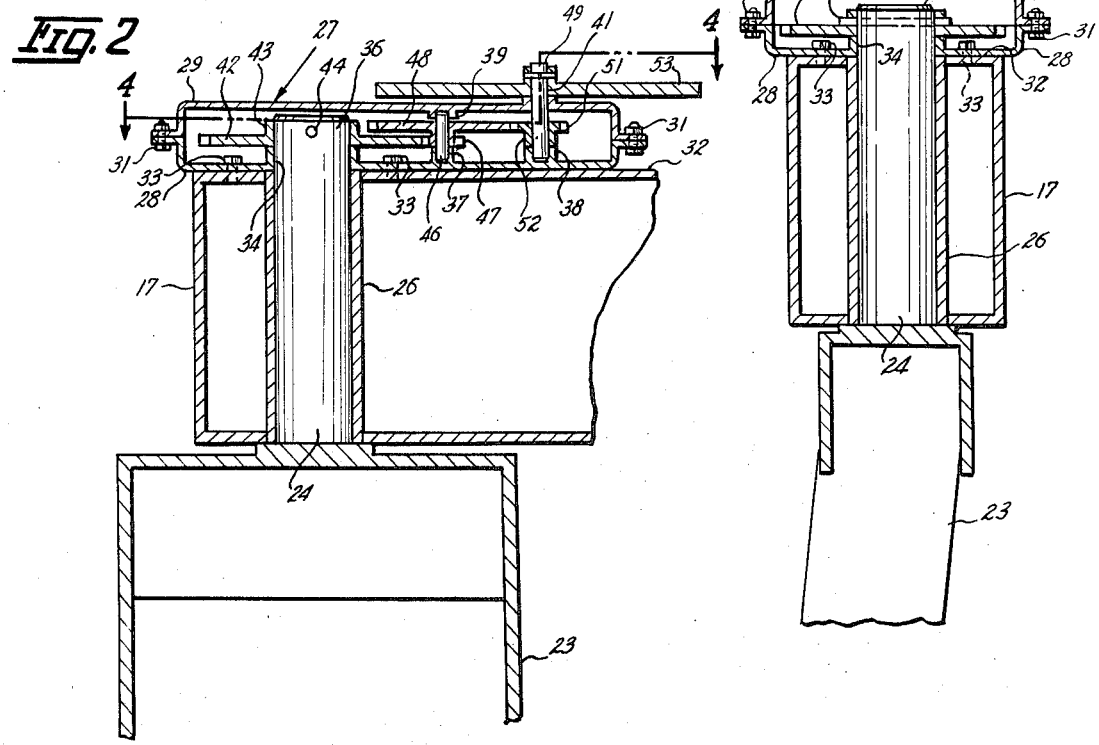
INVENTORS.
FRANK A. DePUYDT
EUGENE P. CONRADI
BY Rudolph L. Lowell
ATTORNEY.

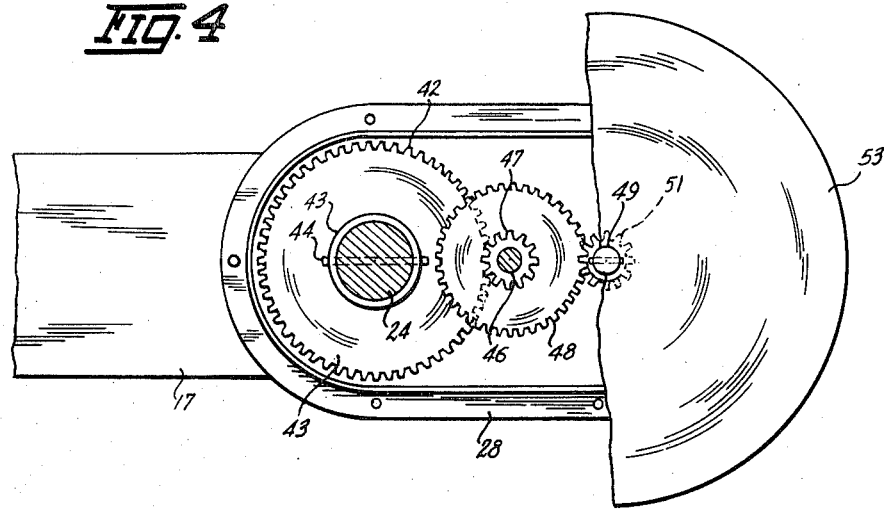
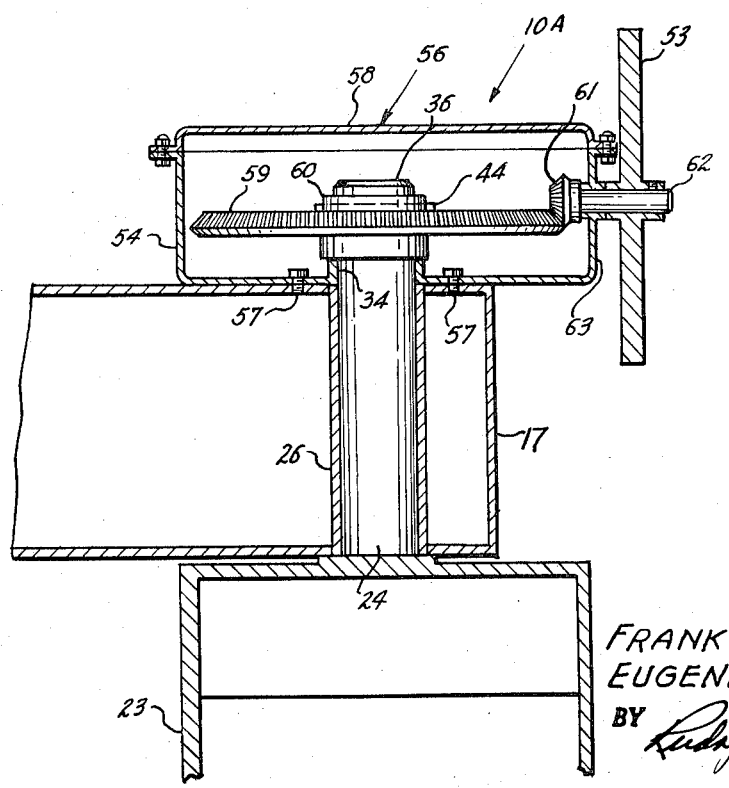

METHOD AND APPARATUS FOR STABILIZING A CASTER WHEEL AGAINST WHIP ACTION

SUMMARY OF THE INVENTION

The anti-whip device of this invention is of a simple and compact construction and efficient in operation to substantially eliminate any whip action in a freely turnable caster wheel. The connection of the caster wheel king pin in a rotationally reduced speed relation with a fly wheel prevents any sudden turning movement of the caster wheel in response to forces encountered by road surface and speed conditions. Before the caster wheel can turn the inertia of the fly wheel must be overcome. The lag or time delay between the application of a force acting on the wheel tending to turn the same, and the overcoming of the fly wheel inertia against rotational movement, is generally of sufficient duration to restrain or stabilize the caster wheel against turning during those intervals occurring between successive applications of such forces. Importantly, this dampening action of the fly wheel during a forward advance of the caster wheel, does not set up any biasing counter turn effect on the caster wheel and does not interfere with a normal turning action of the caster wheel to follow a turning movement of the portable frame on which it is carried.

BACKGROUND OF THE INVENTION

Anti-whip devices for caster wheels now generally available include springs, cam mechanisms or fluid dampening units which attempt to hold the caster wheel in a neutral position against the tendency of the wheel to whip when the frame supported thereby is advanced in a straight line. However, these devices have been generally unsatisfactory since the counter force for resisting the whip of the caster wheel in one direction immediately yields and then acts to immediately return the wheel to the neutral position against the counter force for resisting the whip in an opposite direction. Often times the wheel return movement by a counter force tends to override the neutral position. Under travel conditions on rough roads or at relatively high speeds these oppositely acting counter-forces in the prior anti-whip devices tend to aggravate rather than reduce the tendency of the caster wheel to whip.

BRIEF DESCRIPTION OF THE DRAWINGS

FIG. 1 is a perspective view of a hay and grain windrowing machine showing anti-whip devices of this invention in assembly relation with the ground engaging caster wheels thereof;

FIG. 2 is an enlarged sectional view of the anti-whip device taken on the line 2 — 2 in FIG. 1;

FIG. 3 is an enlarged sectional view of the anti-whip device as seen on the line 3 — 3 in FIG. 1;

FIG. 4 is a sectional view of the anti-whip device taken on the line 4 — 4 in FIG. 2; and FIG. 5 is a modified form of anti-whip device illustrated similarly to FIG. 2.

DETAILED DESCRIPTION OF THE INVENTION

Referring to FIG. 1 of the drawing, the anti-whip device of this invention, indicated generally as 10, is shown in assembly relation with a caster wheel unit 11 for a grain and hay windrowing machine 12. The machine 12 illustrated is a John Deere model 800 and includes a portable frame 13 having a forward mounted windrowing mechanism 14. Pairs of traction-steering wheels 16 are located behind the mechanism 14 with a pair of caster wheel units 11 being supported from a rear transverse member 17 of the frame 13. The windrowing mechanism 14 and the wheels 16 are driven from a power unit 18 mounted on the rear end of the frame 13 and operated from a control or operator's station 19 located between the power unit 18 and the windrowing mechanism 14.

Each caster wheel unit 11 is comprised of a ground wheel 21 positioned between and rotatably supported on a shaft 22 between the legs of an inverted U-frame or yoke member 23. An upright king pin or rotatable support member 24 (FIGS. 2 and 3) projects upwardly through a tubular bearing 26 extended through and located within the rear frame member 17 which is of a rectangular tubular shape in transverse cross-section.

The anti-whip device 10 includes a housing unit 27 that has a lower flat section 28 of a generally oval shape and a mating upper flat section 29 which are fastened together by bolts 31. The lower section 28 is secured to the upper side 32 of the frame member 17 by screws 33 so as to extend longitudinally of the frame member 17 with an opening 34 therein in coaxial alignment with the king pin bearing 26. The diameter of the hole 34 is substantially equal to the inner diameter of the tubular bearing 26 so as to constitute an extension of the bearing. The king pin 24 is of a length such that the upper section 36 thereof projects through the opening 34 and into the housing unit 27.

The opening 34 is in line longitudinally of the housing section 28 with a pair of bearing sockets 37 and 38 (FIG. 2) with the socket 37 positioned between the opening 34 and the end socket 38. The upper housing section 29 is formed with a bearing socket 39 arranged opposite from and corresponding to the lower center socket 37, and with an opening 41 opposite from and in axial alignment with the end socket 38.

Positioned within the housing unit 27 and mounted on the upper section 36 of the king pin 24 is a gear member 42 (FIGS. 2 and 4) having a hub 43 connected to the king pin for rotation therewith by a coupling pin 44 extended transversely through the king pin 24 and hub 43. It will be noted that this coupling connection provides for the gear 42 also functioning as a stop collar on the king pin 24 preventing its withdrawal downwardly from the bearing 26. A stub shaft 46 having its ends rotatably received within the socket bearings 37 and 39 carries a first gear 47 in meshing engagement with the gear 42 on the king pin 24, and a second gear 48 positioned to one side of the gear 42.

A shaft 49, hereinafter to be referred to as the flywheel shaft, has its lower end rotatably received within the bearing socket 38 and carries thereof within the housing unit 27 a pinion gear 51 in meshed engagement with the gear 48 on the stub shaft 46. The pinion gear 51 has a hub 52 engageable with the side wall of the bearing socket 38. The upper end of the flywheel shaft 49 projects upwardly through the opening 41 for the mounting thereon of a flywheel 53.

It is seen, therefore, that in response to a turning movement of the caster wheel 21, the resultant rotation of the king pin 24 acting through the gear system within the housing unit 27 tends to rotate the flywheel 53. The gear system is arranged to effect an increase in the rate of rotation of the flywheel 53 relative to the rotational rate of the king pin 24. As a result of this increased rotational speed of the flywheel 53 relative to the king pin the tendency of the king pin to rotate, in response to a whip force applied to the wheel by its contact with road surface irregularities, is inhibited or prevented by the inertia resistance of the flywheel 53. Stated otherwise, rotation of the king pin 24 will not take place without a corresponding increased rotational movement of the flywheel 53. However, since the time required to overcome the inertia effect of the flywheel 53 is usually greater than the duration of the force tending to whip the wheel 21, the inertia of the flywheel 53 effectively maintains the caster wheel against any sudden turning movements from a straight line advance. Importantly, it will be noted that the tendency of the caster wheel to whip is counteracted by the inertia of the flywheel 53 without setting up any counteracting resilient force.

The flywheel 53 for a normal or intended turning movement of the caster wheel 21, by virtue of the sustained turning force acting on the wheel, is rotated through the gear system to permit such turning movement. Likewise, on the completion of such turning movement the flywheel 53, again in response to the sustained force application on the caster wheel acting to move the wheel out of the turn, is rotatable to bring the caster wheel to its neutral or straight line advance position.

In the modified form of anti-whip device 10A, shown in FIG. 5, the king pin 24 of the caster wheel unit 11 has its upper section 36 located within the lower section 54 of a housing unit 56. The housing section 54 is secured to the frame member 17 by screws 57 and is closed by a mating upper housing section 58. Mounted on the king pin section 36 is a large bevel gear 59 having a hub 60 through which the coupling pin 44 is inserted. In meshed engagement with the bevel gear 59 is a small bevel gear 61. A stub shaft 62 for the gear 61, arranged normal to the axis of the king pin 24, is rotatably supported in and projects outwardly from an end wall 63 of the lower housing section 54. The fly wheel 53 is carried on the projected end of the shaft 62 at a position spaced outwardly from the adjacent end of the frame member 17.

The anti-whip device 10A operates similarly to the device 10 in stabilizing the caster wheel 21 against whip action. It is to be understood that in lieu of the gear systems illustrated, chain and sprocket assemblies, friction gear arrangements and the like may be used to interconnect the flywheel 53 with the king pin 24. In the illustrated embodiments, the increase in the rotational speed of the flywheel 53, relative to the king pin 24, is in the ratio of about thirteen to one with the flywheel 53 having a diameter of nine inches and a weight of about eighteen pounds. It will be understood that the overall dimensions of the anti-whip device, along with the speed increase and weight of the flywheel 53 may be relatively varied to accommodate the size and use of the wheel to which it is to be applied. In this respect it will be apparent that caster wheels are not only used on self-propelled farm equipment, as shown in FIG. 1, but are commonly used on all types of vehicle trailers. The anti-whip device of this invention may also be applied to the steering column of vehicles having manually operated steering equipment to reduce the transmittal of road shock to the vehicle operator.

It is to be further understood that although the invention has been described with respect to preferred embodiments thereof it is not to be so limited since changes and modifications can be made therein within the scope of the invention as defined by the appended claims.

I claim:

1. The method for stabilizing, against whip action, a ground-engaging wheel having an upright support member rotatably supported in a portable frame comprising:
   a. rotatably mounting a flywheel on the frame, and
   b. interconnecting the flywheel and support member for rotation of the flywheel at an increased rate of speed relative to the rate of rotation of the support member.

2. For use with a ground engaging wheel for a portable frame having a king pin rotatably supported on the frame;
   a. an anti-whip apparatus for the wheel including a flywheel rotatably mounted on said frame at a position adjacent the king pin; and
   b. means connecting said flywheel with said king pin for rotation at an increased rotational speed relative to the rotational speed of said king pin.

3. For use with a ground-engaging wheel assembly for a portable frame wherein said assembly has a king pin rotatably supported on the frame:
   a. apparatus for stabilizing the wheel against whipping action including a mounting member secured to said frame adjacent said king pin,
   b. a flywheel having a shaft rotatably supported on said mounting member, and
   c. means interconnecting said king pin and said shaft for rotation of said shaft by the king pin at an increased rotational speed relative to the rotational speed of the king pin.

4. The invention of claim 4 wherein:
   a. said mounting member comprises a housing unit, said king pin has a section thereof positioned within said housing unit, and said flywheel shaft has a portion thereof located within said housing unit, and
   b. said interconnecting means is enclosed within said housing unit.

* * * * *